(12) United States Patent
Kang et al.

(10) Patent No.: US 8,681,840 B2
(45) Date of Patent: Mar. 25, 2014

(54) TRANSCEIVERS HAVING LOOPBACK SWITCHES AND METHODS OF CALIBRATING CARRIER LEAKAGE THEREOF

(75) Inventors: Byoung-Joong Kang, Hwaseong-si (KR); Sung-Gi Yang, Seoul (KR); Joung-Hyun Yim, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 83 days.

(21) Appl. No.: 13/439,114

(22) Filed: Apr. 4, 2012

(65) Prior Publication Data

US 2012/0257656 A1 Oct. 11, 2012

Related U.S. Application Data

(60) Provisional application No. 61/472,272, filed on Apr. 6, 2011.

(30) Foreign Application Priority Data

Jun. 17, 2011 (KR) .................. 10-2011-0058876

(51) Int. Cl.
*H04B 1/38* (2006.01)
(52) U.S. Cl.
USPC ........... 375/221; 375/219; 375/220; 375/222; 375/224; 375/226; 375/295; 375/296; 375/316; 455/73; 455/91; 455/114.3; 455/130; 370/272; 370/273; 370/276; 370/297; 330/149; 725/111
(58) Field of Classification Search
USPC ......... 375/219, 220, 221, 222, 224, 226, 295, 375/296, 316; 455/73, 91, 114.3, 130; 370/272, 273, 276, 297; 330/149; 725/111
See application file for complete search history.

(56) References Cited

U.S. PATENT DOCUMENTS

| 6,625,424 B1 | 9/2003 | Mohindra |
| 7,715,836 B2 * | 5/2010 | Vassiliou et al. .............. 455/423 |
| 7,856,048 B1 | 12/2010 | Smaini et al. |
| 8,351,492 B2 * | 1/2013 | Ly-Gagnon .................. 375/221 |
| 2010/0120369 A1 * | 5/2010 | Ko et al. .................... 455/67.11 |

FOREIGN PATENT DOCUMENTS

| JP | 2003528522 A | 9/2003 |
| JP | 2004266609 A | 9/2004 |
| KR | 20020005754 A | 1/2002 |
| KR | 100869919 B1 | 10/2008 |

OTHER PUBLICATIONS

"An 802.11g WLAN SoC", IEEE Journal of Solid-State Circuits, vol. 40, No. 12, Dec. 2005, pp. 2483-2491.

* cited by examiner

*Primary Examiner* — Leon Flores
(74) *Attorney, Agent, or Firm* — Harness, Dickey & Pierce, P.L.C.

(57) ABSTRACT

A transceiver includes a transmitter circuit, a receiver circuit, and the loopback switch. The transmitter circuit performs a digital-to-analog conversion (DAC) operation on a calibration code without a transmission digital signal in a calibration mode to generate a calibration signal. The transmitter circuit up-converts the calibration signal and generates a transmission signal. The receiver circuit down-converts the transmission signal in the calibration mode and generates a receiving digital signal. The loopback switch electrically connects an output terminal of the transmitter circuit and an input terminal of the receiver circuit in the calibration mode. Thus, the transceiver may stably reduce a carrier leakage irrespective of processes, voltages, and temperatures.

18 Claims, 10 Drawing Sheets

TRANSCEIVERS HAVING LOOPBACK SWITCHES AND METHODS OF CALIBRATING CARRIER LEAKAGE THEREOF

CROSS-REFERENCE TO RELATED APPLICATION

This application claims the benefit of provisional U.S. application No. 61/472,272, filed Apr. 6, 2011, and also claims priority under 35 U.S.C. §119 to Korean Patent Application No. 10-2011-0058876 filed on Jun. 17, 2011, the entire contents of each of which are incorporated herein by reference in their entirety.

BACKGROUND

1. Field

Example embodiments of inventive concepts relate to transceivers, for example, transceivers having loopback switches and methods of calibrating carrier leakage thereof.

2. Description of Related Art

A related art transceiver includes a local oscillator and a mixer configured to mix a local oscillator signal and a baseband signal. Local leakage (e.g., carrier leakage) generated by a radio-frequency (RF) transmitter occurs mainly due to a mismatch between the mixer and the local oscillator.

SUMMARY

Example embodiments of inventive concepts provide transceivers capable of more stably reducing carrier leakage.

Example embodiments of inventive concepts also provide methods of calibrating carrier leakage of transceivers.

At least one example embodiment provides a transceiver including a transmitter circuit, a receiver circuit, and a loopback switch. In the normal mode, the transmitter circuit is configured to up-convert a transmission digital signal to generate a first transmission signal. In the calibration mode, the transmitter circuit is configured to: perform a digital-to-analog conversion (DAC) operation on a calibration code without the transmission digital signal to generate a calibration signal; change a bias of a mixer in response to the calibration signal; and output a carrier signal of an oscillator as a second transmission signal. The receiver circuit is configured to down-convert a receiving signal received from an antenna in the normal mode to generate a first receiving digital signal. In the calibration mode, the receiver circuit is configured to down-convert the second transmission signal to generate a second receiving digital signal. The loopback switch is configured to electrically connect an output terminal of the transmitter circuit with an input terminal of the receiver circuit in the calibration mode.

According to at least some example embodiments, the transceiver may further include a baseband processor configured to detect carrier leakage in response to the second receiving digital signal, and to obtain the calibration code by which a direct-current (DC) offset of the transmitter circuit is suppressed and/or minimized. The transmitter circuit may change the bias of the mixer to control leakage of the carrier signal.

The transmitter circuit may include a first DAC, a first low-pass filter (LPF), a second DAC, a first mixer, a third DAC, a second LPF, a fourth DAC, and a second mixer.

The first DAC may perform a DAC operation on an I-path transmission digital signal. The LPF may perform an LPF operation on an output signal from the first DAC to generate a first low-pass filtered transmission signal, but may be disabled in response to a calibration mode signal. The second DAC may perform a DAC operation on an I-path calibration code to generate an I-path calibration signal. The first mixer may mix the first low-pass filtered transmission signal with an I-path transmission local oscillator signal in the normal mode to generate a first I-path transmission signal. In the calibration mode, the first mixer may control leakage of the carrier signal in response to the I-path calibration signal, and output the carrier signal as a second I-path transmission signal. The third DAC may perform a DAC operation on a Q-path transmission digital signal. The second LPF may perform an LPF operation on an output signal from the third DAC to generate a second low-pass filtered transmission signal, but be disabled in response to the calibration mode signal. The fourth DAC may perform a DAC operation on a Q-path calibration code to generate a Q-path calibration signal. The second mixer may mix the second low-pass filtered transmission signal with a Q-path transmission local oscillator signal in the normal mode to generate a first Q-path transmission signal. In the calibration mode, the second mixer may control leakage of the carrier signal in response to the Q-path calibration signal, and output the carrier signal as a second Q-path transmission signal.

The receiver circuit may include a first mixer, a first LPF, a first ADC, a second mixer, a second LPF, and a second ADC.

The first mixer may mix the receiving signal with an I-path receiving local oscillator signal in the normal mode to generate a first I-path receiving signal. Also, the first mixer may mix the second transmission signal with the I-path receiving local oscillator signal in the calibration mode to generate a second I-path receiving signal. The first LPF may perform an LPF operation on an output signal from the first mixer. The first ADC may perform an ADC operation on an output signal from the first LPF and generate an I-path receiving digital signal. The second mixer may mix the receiving signal received from the antenna with a Q-path receiving local oscillator signal in the normal mode to generate a first Q-path receiving signal. Also, the second mixer may mix the second transmission signal with the Q-path receiving local oscillator signal in the calibration mode to generate a second Q-path receiving signal. The second LPF may perform an LPF operation on an output signal from the second mixer. The second ADC may perform an ADC operation on an output signal from the second LPF and generate a Q-path receiving digital signal.

The transceiver may further include a transceiving selection switch between an output terminal of the transmitter circuit and an input terminal of the receiver circuit. The transceiving selection switch may selectively connect the antenna with the output terminal of the transmitter circuit or the input terminal of the receiver circuit.

The transceiver may further include a transmission amplifier and a receiving amplifier. The transmission amplifier may be between the transmitter circuit and the transceiving selection switch to amplify the first transmission signal or the second transmission signal. The receiving amplifier may be between the transceiver selection switch and the input terminal of the receiver circuit.

The transmission amplifier may be a power amplifier, whereas the receiving amplifier may be a low-noise amplifier.

The loopback switch may be between an output terminal of the transmission amplifier and an output terminal of the receiving amplifier.

The loopback switch may be between an input terminal of the transmission amplifier and an output terminal of the receiving amplifier.

The transceiver may further include a local oscillator configured to transmit a transmission local oscillator signal to the transmitter circuit and transmit a receiving local oscillator signal to the receiver circuit.

In the calibration mode, the second receiving digital signal output from the receiver circuit may be data obtained by performing an ADC operation on a DC signal.

At least one other example embodiment provides a method of calibrating carrier leakage of a transceiver. According to at least this example embodiment, the method includes: activating a loopback switch; at least partially disabling a transmitter circuit; calibrating a direct-current (DC) offset of a receiver circuit; enabling the transmitter circuit; first obtaining an optimum code of an I-path by controlling a code applied to a digital-to-analog converter (DAC) of the I-path; second obtaining an optimum code of a Q-path by controlling a code applied to a DAC of the Q-path; and third obtaining the optimum code of the I-path by controlling the code applied to the DAC of the I-path.

The method may further include: detecting a DC offset of the I-path and a DC offset of the Q-path and performing a square-root-sum of the DC offset of the I-path and the DC offset of the Q-path.

At least one other example embodiment provides a method of calibrating a transceiver. According to at least this example embodiment, the method includes: activating a loopback switch; at least partially disabling a transmitter circuit; calibrating a direct-current (DC) offset of a receiver circuit; enabling the transmitter circuit; first obtaining a first code corresponding to an I-path of the transceiver by controlling a code applied to a digital-to-analog converter (DAC) of the I-path; second obtaining an second code corresponding to a Q-path of the transceiver by controlling a code applied to a DAC of the Q-path; and iteratively performing at least one of the first obtaining and the second obtaining to calibrate the transceiver.

According to at least some example embodiments, the method may further include: detecting a DC offset of the I-path and a DC offset of the Q-path; and performing a square-root-sum of the DC offset of the I-path and the DC offset of the Q-path.

At least one other example embodiment provides a transceiver including: a transceiver circuit configured to output a carrier signal as a transmission signal, and to control leakage of a carrier signal based on a calibration signal. The calibration signal is generated based on based on a calibration code, and the calibration code is indicative of a direct-current (DC) offset between paths of the transmission signal received at the transceiver circuit.

According to at least some example embodiments, the transceiver circuit may further include: a transmitter circuit configured to perform digital-to-analog (DAC) conversion of the calibration code to generate the calibration signal, to control the leakage of the carrier signal based on the calibration signal, and to generate the transmission signal based only on the carrier signal; a receiver circuit configured to generate a received digital signal based on the transmission signal; and/or a loopback switch configured to selectively connect an output terminal of the transmitter circuit with an input terminal of the receiver circuit. The calibration code may be generated based on the received digital signal.

The transceiver circuit may further include a baseband processor configured to detect a DC offset between paths of the transmission signal, and to generate the calibration code based on the detected DC offset.

BRIEF DESCRIPTION OF THE DRAWINGS

The foregoing and other features of example embodiments will be apparent from the following description of the accompanying drawings in which like reference characters refer to the same parts throughout the different views. The drawings are not necessarily to scale, emphasis instead being placed upon illustrating the principles of inventive concepts. In the drawings.

DETAILED DESCRIPTION

Figure 1:
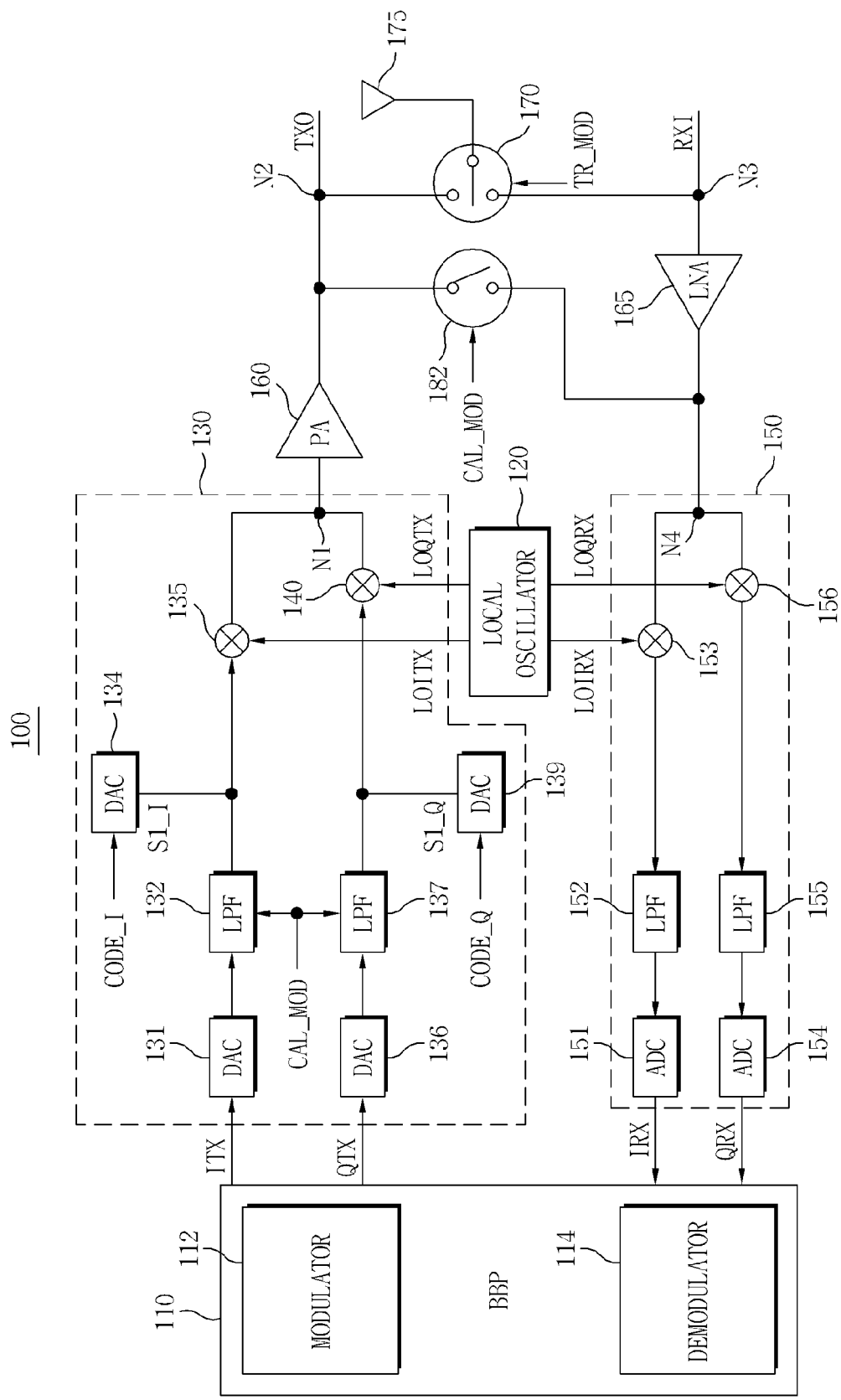
FIG. 1 is a circuit diagram of a transceiver according to an example embodiment of inventive concepts.

Since example embodiments are provided only for structural and functional descriptions of inventive concepts, inventive concepts should not be construed as limited to the example embodiments set forth herein. Thus, it will be clearly understood by those skilled in the art that example embodiments of inventive concepts may be embodied in different forms and include equivalents that can realize the spirit of inventive concepts.

The terminology used herein should be understood as follows.

It will be understood that, although the terms first, second, etc. may be used herein to describe various elements, components, regions, layers and/or sections, these elements, components, regions, layers, and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

As used herein, the term "and/or" includes any and all combinations of one or more of the associated listed items. Thus, "first, second, and/or third items" not only include a first, second, or third item but also mean any and all combinations of one or more of the first, second, and third items.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Meanwhile, spatially relative terms, such as "between" and "directly between" or "adjacent to" and "directly adjacent to" and the like, which are used herein for ease of description to describe one element or feature's relationship to another element(s) or feature(s) as illustrated in the figures, should be interpreted similarly.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless expressly defined in a specific order herein, respective steps described in the inventive concept may be performed otherwise. That is, the respective steps may be performed in a specified order, substantially at the same time, or in reverse order.

Various example embodiments will now be described more fully with reference to the accompanying drawings in which some embodiments are shown.

FIG. 1 is a circuit diagram of a transceiver according to an example embodiment of inventive concepts.

Referring to FIG. 1, a transceiver 100 includes a baseband processor 110, a transmitter circuit 130, a receiver circuit 150, an antenna 175, and a loopback switch 182.

The baseband processor 110 includes a demodulator 114 configured to demodulate received digital signals IRX and QRX from the receiver circuit 150. The baseband processor 110 further includes a modulator 112 configured to modulate signals to be transmitted to generate transmission digital signals ITX and QTX. The baseband processor 110 outputs the transmission digital signals ITX and QTX to the transmission circuit 130.

The baseband processor 110 is also configured to detect carrier leakage in response to a received digital signal from the receiver circuit 150, and to generate calibration codes CODE_I and CODE_Q according to the detected carrier leakage. The transceiver 100 may suppress (e.g., minimize DC offset) of the transmitter circuit 130 based on the generated calibration codes CODE_I and CODE_Q.

Still referring to FIG. 1, in a normal mode the transmitter circuit 130 up-converts the transmission digital signals ITX and QTX from the baseband processor 110 to generate a first transmission signal.

In a calibration mode, the transmitter circuit 130 performs a digital-to-analog conversion (DAC) operation on the calibration codes CODE_I and CODE_Q, without use of the transmission digital signals ITX and QTX, to generate calibration signals S1_1 and S1_Q. The transmitter circuit 130 is configured to change a DC bias of a mixer having a differential structure and control leakage of a carrier signal in response to the generated calibration signals S1_I and S1_Q, and output a carrier signal generated by an oscillator as a second transmission signal.

In more detail with regard to FIG. 1, the transmitter circuit 130 includes a first digital-to-analog converter (DAC) 131, a first low-pass filter (LPF) 132, a second DAC 134, a first mixer 135, a third DAC 136, a second LPF 137, a fourth DAC 139, and a second mixer 140. The first and second mixers 135 and 140 are connected to a transmission amplifier 160 at node N1.

The first DAC 131 performs a DAC operation on the I-path transmission digital signal ITX from the baseband processor 110. In the normal mode, the first LPF 132 performs an LPF operation on an output signal of the first DAC 131 to generate a first low-pass filtered transmission signal. In the calibration mode, however, the first LPF 132 is disabled in response to a calibration mode signal CAL_MOD, and the second DAC 134 performs a DAC operation on the I-path calibration code CODE_I to generate an I-path calibration signal S1_I.

Still referring to the transmitter circuit 130 in FIG. 1, in the normal mode, the first mixer 135 mixes the first low-pass filtered transmission signal with an I-path transmission local oscillator signal LOITX to generate the first I-path transmission signal. In the calibration mode, however, the first mixer 135 may change the DC bias of the mixer having the differential structure in response to or based on the I-path calibration signal S1_I to control the leakage of the carrier signal, and output the carrier signal as a second I-path transmission signal.

Still referring to the transmission circuit 130 in FIG. 1, the third DAC 136 performs a DAC operation on the Q-path transmission digital signal QTX. In the normal mode, the second LPF 137 performs an LPF operation on an output signal of the third DAC 136 to generate a second low-pass filtered transmission signal. In the calibration mode, however, the LPF 137 is disabled in response to the calibration mode signal CAL_MOD, and the fourth DAC 139 performs a DAC operation on the Q-path calibration code CODE_Q to generate the Q-path calibration signal S1_Q.

In the normal mode, the second mixer 140 mixes the second transmission signal with a Q-path transmission local oscillator signal LOQTX to generate a first Q-path transmission signal. In the calibration mode, however, the second mixer 140 controls the leakage of the carrier signal in response to the Q-path calibration signal S1_Q, and outputs the carrier signal as a second Q-path transmission signal.

Each of the first and second mixers 135 and 140 outputs a transmission signal via output node N1.

Still referring to FIG. 1, a transmission amplifier 160 is between the output node N1 of the transmitter circuit 130 and a terminal (e.g., a node N2) of a transceiving selection switch 170. The transmission amplifier 160 amplifies the transmission signal (e.g., first or second transmission signal) output from the transmitter circuit 130.

The transceiver 100 further includes a local oscillator 120 configured to generate the local oscillator signals LOITX and LOQTX to the transmitter circuit 130.

A loopback switch 182 is connected between the output of the transmission amplifier 160 and the input of the receiver circuit 150. The loopback switch 182 selectively connects an output terminal of the transmission amplifier 160 with the input terminal of the receiver circuit 150. For example, in the calibration mode the loopback switch 182 electrically connects an output terminal of the transmission circuit 130 with an input terminal of the receiver circuit 150. As a result, in the calibration mode, the second transmission signal output from the transmission circuit 130 is transmitted to the receiver circuit 150.

As mentioned above the transceiver 100 also includes a receiver circuit 150. In the normal mode, the receiver circuit 150 down-converts a received signal RXI received from the antenna 175 and generates a first received digital signal. In the calibration mode, however, the receiver circuit 150 down-converts the second transmission signal received from the transmission circuit 130 via the loopback switch 182 and generates a second received digital signal.

As shown in FIG. 1, the receiver circuit 150 includes a third mixer 153, a third LPF 152, a first ADC 151, a fourth mixer 156, a fourth LPF 155, and a second ADC 154. The third and fourth mixers 153 and 156 are connected to the receiving amplifier 160 at the node N4.

In the normal mode, the third mixer 153 mixes the receiving signal RXI with the I-path receiving local oscillator signal LOIRX to generate a first I-path receiving signal. In the calibration mode, however, the third mixer 153 mixes the second transmission signal output from the transmission circuit 130 with the I-path receiving local oscillator signal LOIRX to generate a second I-path receiving signal.

The third LPF 152 then performs an LPF operation on an output signal from the third mixer 153. The first ADC 151 performs an ADC operation on an output signal from the third LPF 152 to generate an I-path receiving digital signal IRX.

In the normal mode, the fourth mixer 156 mixes the receiving signal RXI from the antenna 175 with the Q-path receiving local oscillator signal LOQRX to generate a first Q-path receiving signal. In the calibration mode, however, the fourth mixer 156 mixes the second transmission signal from the transmission circuit 130 with the Q-path receiving local oscillator signal LOQRX to generate a second Q-path receiving signal.

The fourth LPF 155 performs an LPF operation on an output signal from the fourth mixer 156. The second ADC 154 performs an ADC operation on an output signal from the fourth LPF 155 to generate a Q-path receiving digital signal QRX.

The local oscillator 120 generates the receiving local oscillator signals LOIRX and LOQRX.

As mentioned above, the transmitter circuit 130 is configured to change a bias of the mixer and control the leakage of the carrier signal. In one example, the baseband processor 110 detects carrier leakage in response to a second received digital signal from the receiver circuit 150, and generates calibration codes CODE_I and CODE_Q. The transceiver 100 then suppresses (e.g., minimizes) DC offset of the transmitter circuit 130 based on the generated calibration codes CODE_I and CODE_Q.

Still referring to FIG. 1, the transceiver 100 includes a transceiving selection switch 170 between the output terminal of the transmitter circuit 130 (or transmission amplifier 160) and the input terminal of the receiver circuit 150 (or receiving amplifier 165). The transceiving selection switch 170 is configured to selectively connect the antenna 175 with the output terminal of the transmission amplifier 160 or the input terminal of the receiving amplifier 165 in response to a transceiving selection signal TR_MOD.

The transmission amplifier 160 is between an output node N1 of the transmitter circuit 130 and a terminal (e.g., a node N2) of the transceiving selection switch 170. The transmission amplifier 160 amplifies the first transmission signal or the second transmission signal output from the transmitter circuit 130. The transmission amplifier 160 may be a power amplifier.

The receiving amplifier 165 is between a terminal (e.g., node N3) of the transceiving selection switch 170 and the input terminal of the receiver circuit 150. The receiving amplifier 165 may be a low-noise amplifier.

The loopback switch 182 is between an output node of the transmission amplifier 160 and an output node N4 of the receiving amplifier 165.

In the transceiver 100 of FIG. 1, the loopback switch 182 and the first and second LPFs 132 and 137 operate in response to the calibration mode signal CAL_MOD. In one example, when the calibration mode signal CAL_MOD is enabled, the loopback switch 182 turns on, and the first and second LPFs 132 and 137 are disabled.

In the transceiver 100 of FIG. 1, the transceiving selection switch 170, which selectively combines the output terminal of the transmitter circuit 130 and the input terminal of the receiver circuit 150 with the antenna 175, operates in response to a transceiving mode signal TR_MOD. For example, when the transceiving mode signal TR_MOD is in a logic high state, the transceiving selection switch 170 combines the output from the transceiver circuit 130 with the antenna 175. When the transceiving mode signal TR_MOD is in a logic low state, the transceiving selection switch 170 combines the input to the receiver circuit 150 with the antenna 175.

Figure 2:
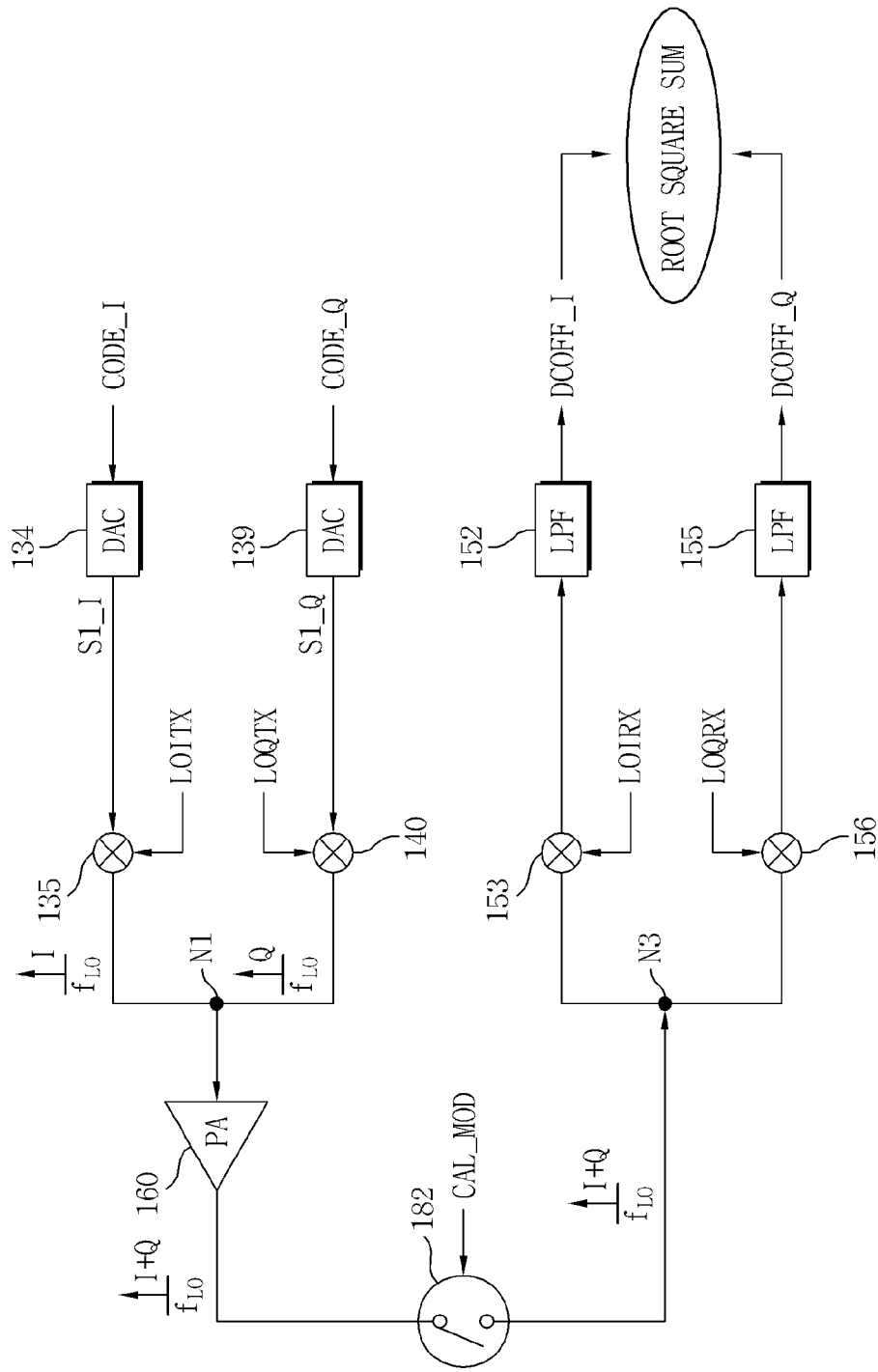
FIG. 2 is a circuit diagram illustrating example operation of the transceiver of FIG. 1 in a calibration mode.

FIG. 2 is a circuit diagram illustrating example operation of the transceiver of FIG. 1 in the calibration mode. In FIG. 2, the receiving amplifier 165 is omitted for brevity.

In FIG. 2, the first and second LPFs 132 and 137 are disabled in the calibration mode, and thus, not shown.

Hereinafter, further example operation of the transceiver of FIG. 1 according to example embodiments of inventive concepts will be described with reference to FIGS. 1 and 2.

Local leakage generated by a radio-frequency (RF) may occur due to a mismatch between a mixer and the local oscillator 120, and may be referred to as carrier leakage.

Referring to FIG. 1, in the normal mode, the transceiver 100 up-converts the transmission digital signals ITX and QTX to generate a transmission signal, and down-converts the receiving signal RXI received from the antenna 175 to generate the receiving digital signal.

In the calibration mode, the transceiver 100 performs a DAC operation on calibration codes CODE_I and CODE_Q without the transmission digital signals ITX and QTX to generate calibration signals S1_I and S1_Q. The transceiver 100 changes a DC bias of the mixer having a differential structure and controls leakage of a carrier signal in response to the calibration signals S1_I and S1_Q. The transceiver 100 then outputs the carrier signal generated by the local oscillator 120 as a second transmission signal. In this case, the transmission signal includes only the carrier signal, not the transmission digital signals ITX and QTX.

In the calibration mode, the loopback switch 182 electrically connects the output terminal of the transmitter circuit 130 with the input terminal of the receiver circuit 150 in response to the calibration mode signal CAL_MOD. As a result, the second transmission signal is output to the receiver circuit 150. The receiver circuit 150 down-converts the second transmission signal to generate a second received digital signal. Also, as mentioned above, in the calibration mode, the first and second LPFs 132 and 137 are disabled in response to the calibration mode signal CAL_MOD.

Also in the calibration mode, the baseband processor 110 detects carrier leakage in response to the second receiving digital signal and generates calibration codes CODE_I and CODE_Q by which a DC offset of the transmitter circuit 130 is suppressed (e.g., minimized).

Turning to FIG. 2, a signal transmitted from the transmitter circuit 130 through the loopback switch 182 to the receiver circuit 150 is converted into a low-frequency signal by the mixers 153 and 156. The transceiver 100 performs root-square-sum of an I-path DC offset DCOFF_I, which is an output of the third LPF 152, and a Q-path DC offset DCOFF_Q, which is an output of the fourth LPF 155. The transceiver 100 then compares the DC offsets. In this example, the transceiver 100 obtains (DCOFF_I$^2$+

DCOFF_Q$^2$)$^{1/2}$ using the I-path DC offset DCOFF_I and the Q-path DC offset DCOFF_Q, and then compares the DC offsets.

According to at least some example embodiments, a calibration method includes obtaining an I-path calibration code by which a DC offset is suppressed (e.g., minimized), while varying the I-path calibration code, when a Q-path calibration code is fixed at a center code. The Q-path calibration code by which the DC offset is suppressed, is obtained while varying the Q-path calibration code, when the I-path calibration code is fixed. Thereafter, the I-path calibration code by which the DC offset is suppressed is obtained while varying the I-path calibration code, when the Q-path calibration code is fixed.

Figure 3:
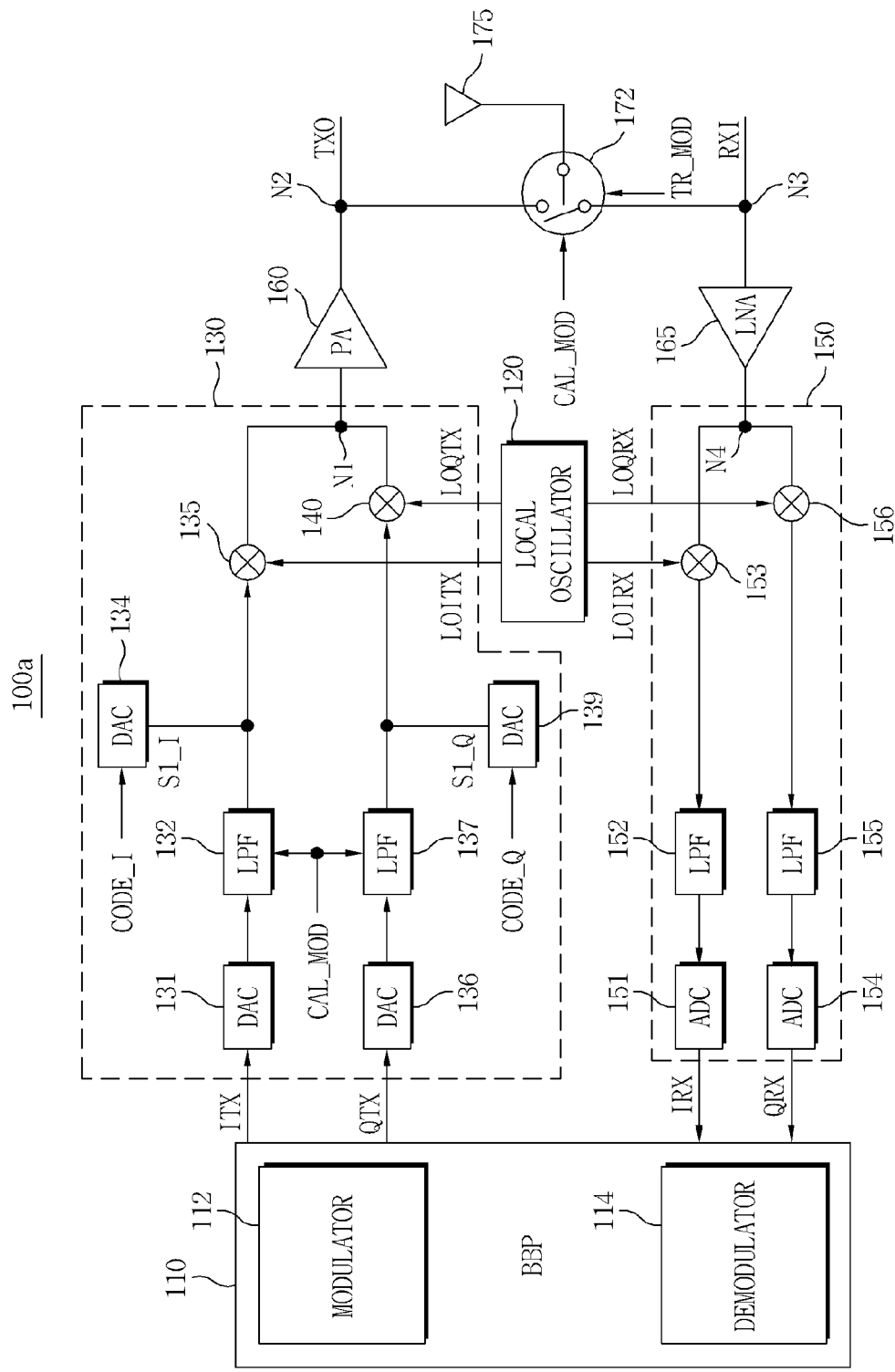
FIG. 3 is a circuit diagram of a transceiver according to another example embodiment of inventive concepts.

FIG. 3 is a circuit diagram of a transceiver according to another example embodiment of inventive concepts.

Referring to FIG. 3, the transceiver 100a is similar to the transceiver 100 shown in FIG. 1, except that the loopback switch 182 and the transceiving selection switch 170 included in the transceiver 100 of FIG. 1 are replaced by a single switch 172.

In a normal mode, the switch 172 selectively connects an antenna 175 with an output terminal of the transceiver 130 or an input terminal of the receiver circuit 150 in response to a transceiving selection signal TR_MOD. In the calibration mode, the switch 172 electrically connects the output terminal of the transmitter circuit 130 with the input terminal of the receiver circuit 150. As shown in FIG. 3, the transmitter 130 is connected to the receiver circuit 150 through a transmission amplifier 160 and a receiving amplifier 165.

The remaining configuration of the transceiver 100a is similar to, substantially similar to, the same as, or substantially the same as that of the transceiver 100 of FIG. 1. The transmission amplifier 160 may be a power amplifier, and the receiving amplifier 165 may be a low-noise amplifier.

Figure 4:
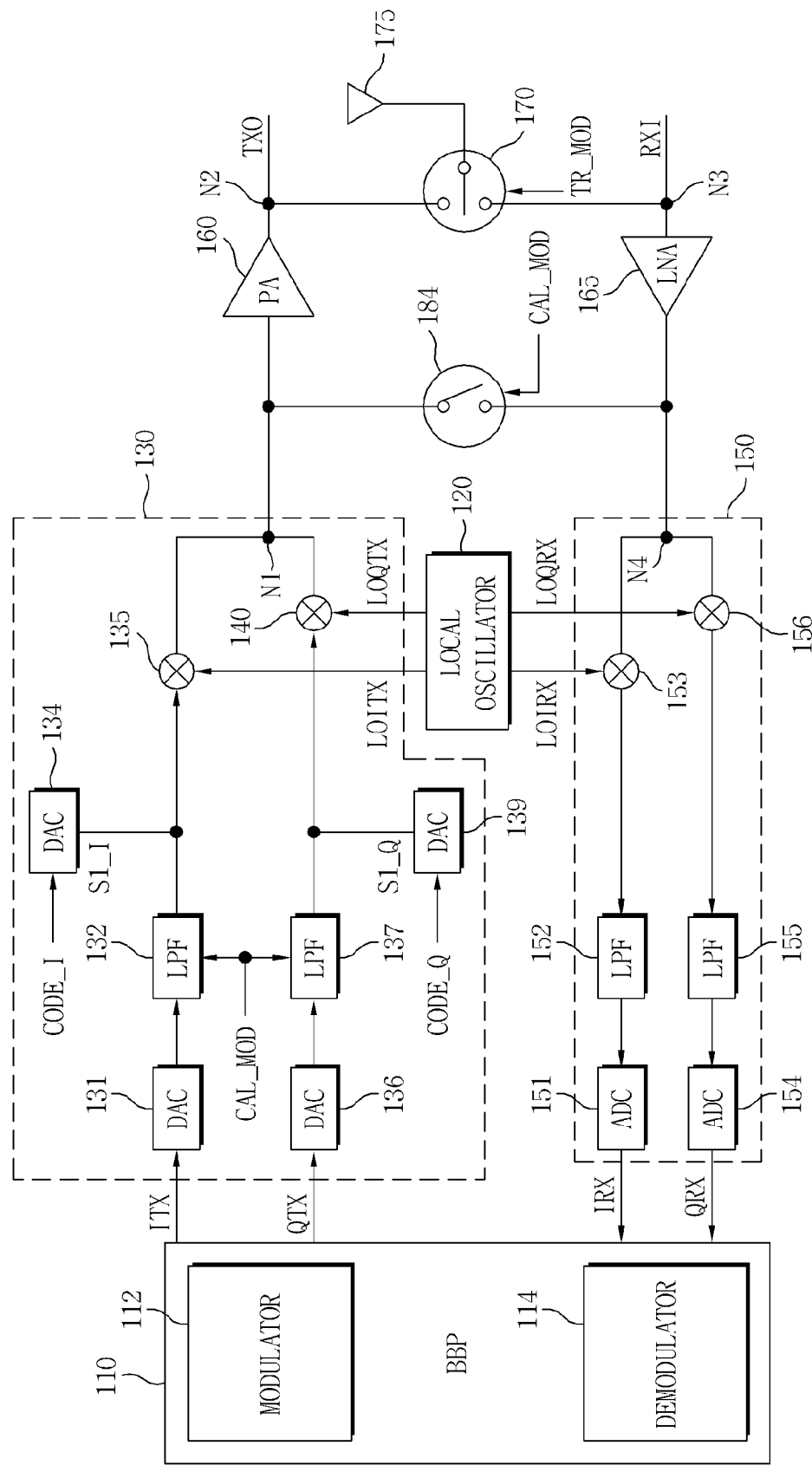
FIG. 4 is a circuit diagram of a transceiver according to still another example embodiment of inventive concepts.

FIG. 4 is a circuit diagram of a transceiver 100b according to another example embodiment of inventive concepts.

The transceiver 100b shown in FIG. 4 is similar to the transceiver 100 shown in FIG. 1, except that the positioning of the loopback switch 184 in the transceiver 100b is different from the positioning of the loopback switch 182 in the transceiver 100. The remaining configuration of the transceiver 100b may be similar to, substantially similar to, the same as, or substantially the same as that of the transceiver 100 of FIG. 1.

As shown in FIG. 4, the loopback switch 184 is between an input terminal of the transmission amplifier 160 and an output terminal of the receiving amplifier 165.

Figure 5:
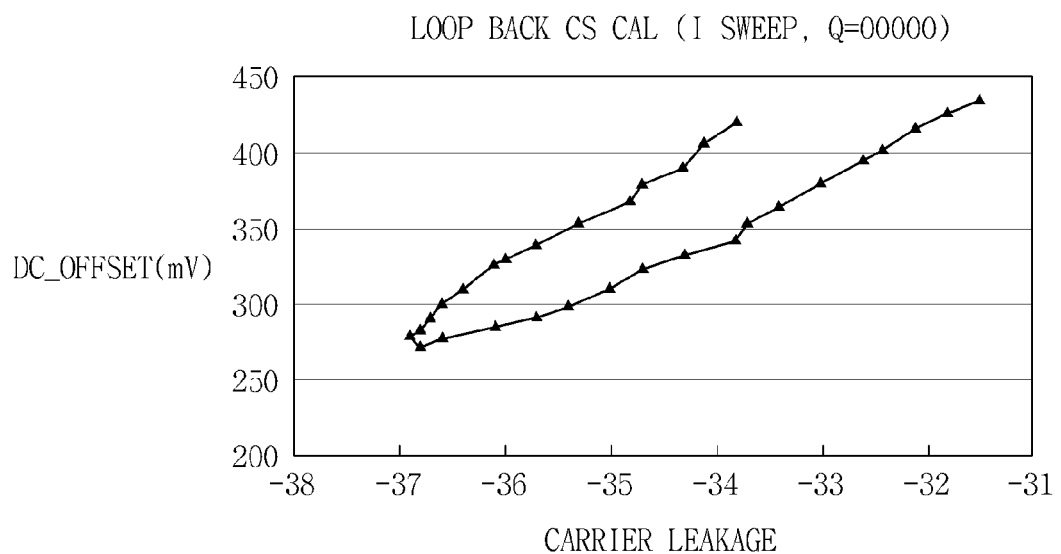
FIGS. 5 and 6 are graphs showing an example direct-current (DC) offset voltage relative to carrier leakage.
Figure 6:
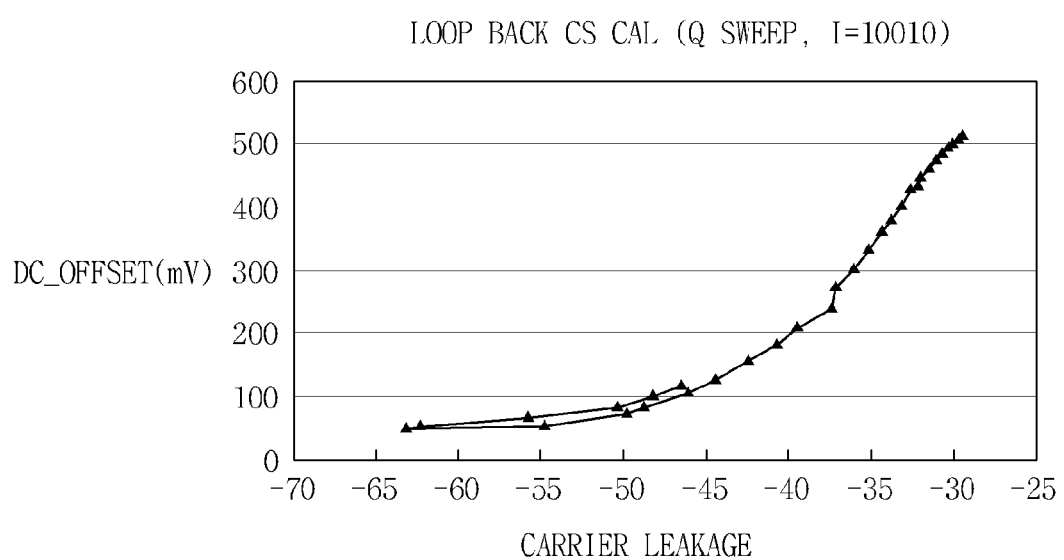
Figure 7:
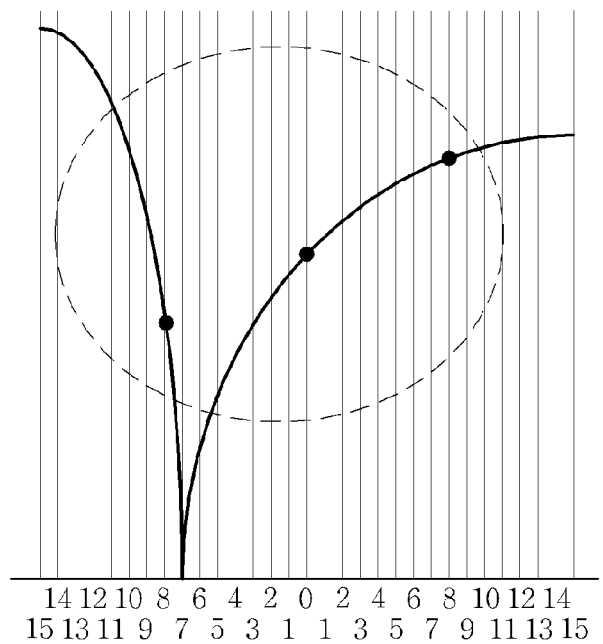
FIGS. 7 through 10 are diagrams showing examples of an algorithm for obtaining a minimum point.

FIGS. 5 and 6 are example graphs showing a direct-current (DC) offset voltage relative to carrier leakage. Specifically, FIG. 5 shows an example relation between carrier leakage and a DC offset DC_OFFSET of a transmitter circuit when Q is fixed at a center code "00000" and I is swept. FIG. 6 shows an example relation between carrier leakage and a DC offset DC_OFFSET of the transmitter circuit when I is fixed at "10010" and Q is swept.

Referring to FIG. 5, an I-code by which a DC offset is suppressed may be "10010", and local leakage (e.g., carrier leakage) may be about −36.9 dBm.

Referring to FIG. 6, when I is fixed at "10010" and Q is swept, a Q-code by which a DC offset is suppressed may be "11010", and carrier leakage may be about −63.2 dBm.

Accordingly, it can be seen that carrier leakage is reduced using the method of calibrating carrier leakage according to example embodiments of inventive concepts.

FIGS. 7 through 10 are diagrams showing examples of an algorithm for obtaining a reduced (e.g., minimum) point. In FIGS. 7 through 10, although not shown, numbers on the left of "0" denote negative (−) values, while numbers on the right of "0" denote positive (+) values.

Figure 8:
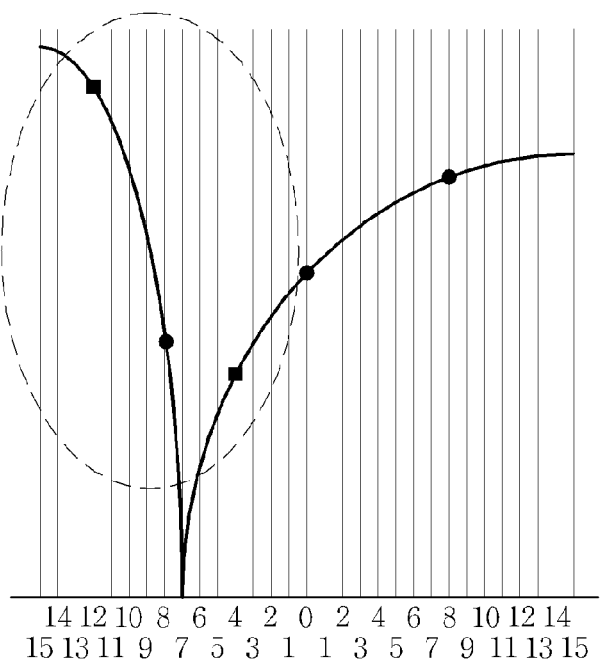

In FIGS. 7 through 10, an X value is a calibration code, and a Y value is (DCOFF_I$^2$+DCOFF_Q$^2$)$^{1/2}$. To begin, a total range of X values is divided by 4, and Y values (DCOFF_I$^2$+DCOFF_Q$^2$)$^{1/2}$ relative to codes corresponding to ¼, ½, and ¾ of the total range are measured. FIG. 8 show Y values (DCOFF_I$^2$+DCOFF_Q$^2$)$^{1/2}$ relative to codes (e.g., −8, 0, and 8) corresponding to the X values.

Figure 9:
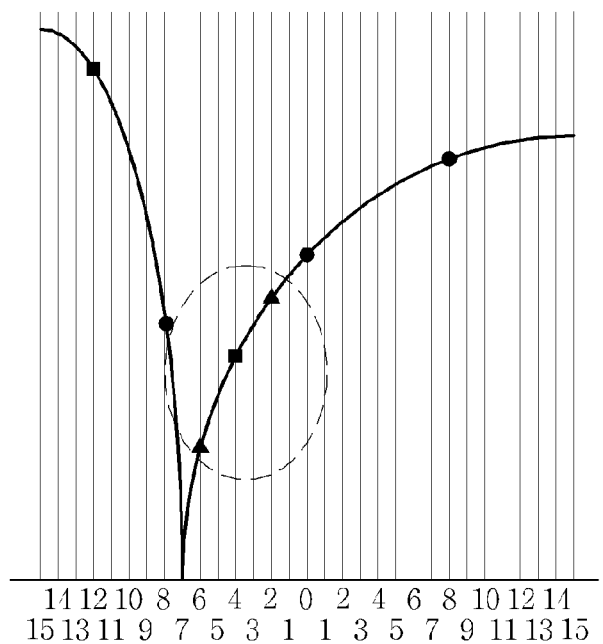
Figure 10:
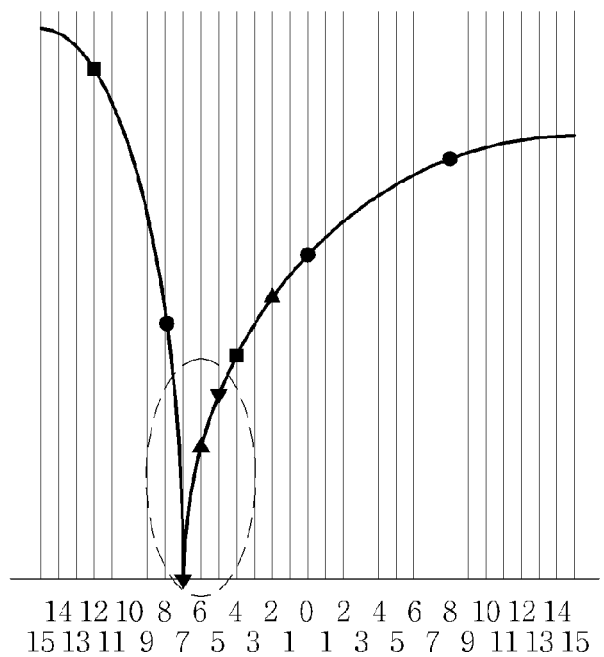

Here, a code corresponding to the smallest Y value (DCOFF_I$^2$+DCOFF_Q$^2$)$^{1/2}$ is about −8. Next, Y values relative to codes (e.g., −12 and −4) spaced apart from an X value of about −8 on left and right sides thereof at intervals of about ⅛ is obtained as shown in FIG. 9. Here, a code corresponding to the smallest Y value is about −4. Next, Y values relative to codes (e.g., −6 and −2) spaced apart form an X value of about −4 on left and right sides thereof at intervals of about ¹⁄₁₆ is obtained as shown in FIG. 10. Here, a code corresponding to the smallest Y value is about −6. Next, Y values relative to codes (e.g., −7 and −5) spaced apart from an X value of about −6 on left and right sides thereof at intervals of about ¹⁄₃₂ is obtained as shown in FIG. 10. Here, an X value corresponding to the smallest Y value is about −7. Because codes cannot be further divided on left and right sides of the X value of about −7, calibration of an I- or Q-path is finished.

Thus, a minimum point may be obtained using the same or substantially the same algorithm described above with regard to FIGS. 7 through 10. For example, a minimum value of detected DC offsets of the transmitter circuit may be obtained using the method shown in FIGS. 7 through 10.

Figure 11A:
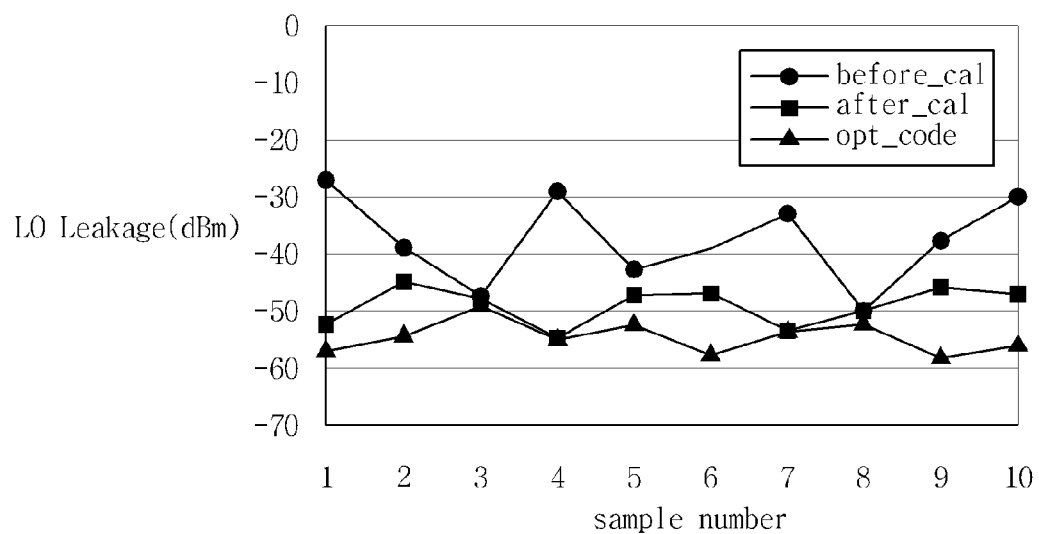
FIGS. 11A and 11B are graphs showing example local oscillator leakage and code error when a carrier frequency is 4.5 GHz.
Figure 11B:
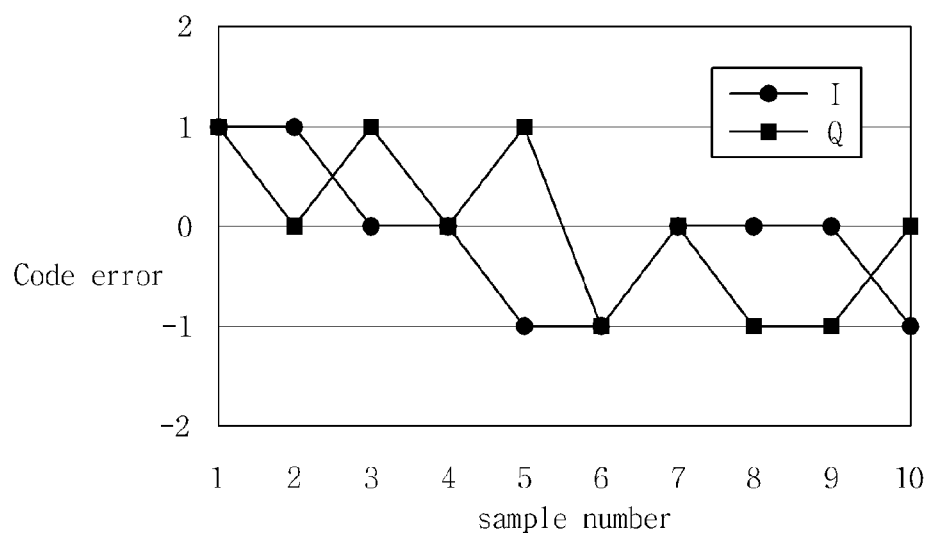

FIGS. 11A and 11B are graphs showing example local oscillator leakage and code error when a carrier frequency is about 4.5 GHz.

Referring to FIG. 11A, it can be seen that when the carrier frequency is about 4.5 GHz, carrier leakage (e.g., local leakage) is reduced more than before a calibration operation according to example embodiments of inventive concepts is performed.

Referring to FIG. 11B, it can be seen that few code errors (e.g., one or two code errors) occur due to the calibration method according to example embodiments of inventive concepts.

Figure 12A:
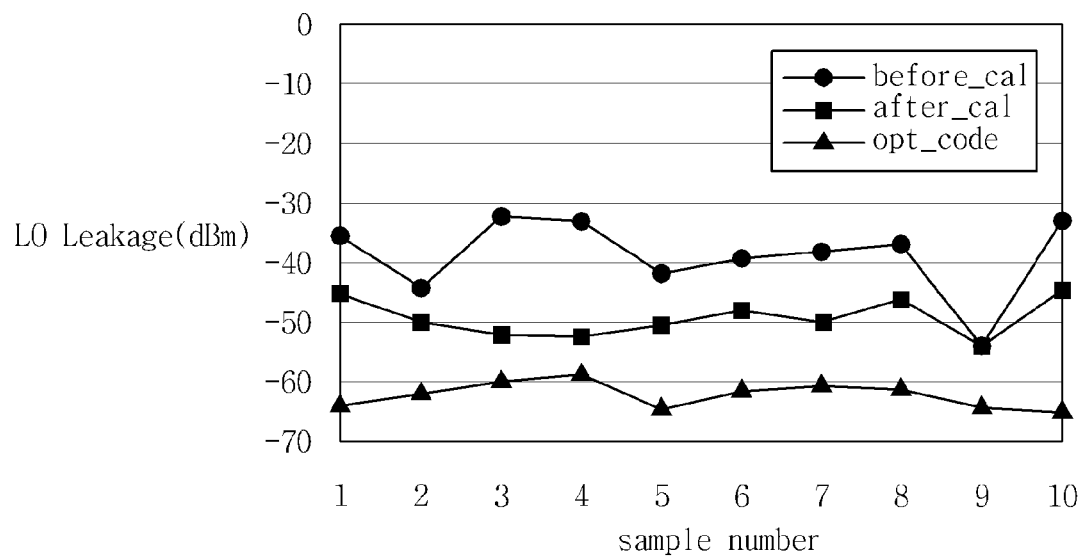
FIGS. 12A and 12B are graphs showing example local oscillator leakage and code error when a carrier frequency is 8.7 GHz.
Figure 12B:
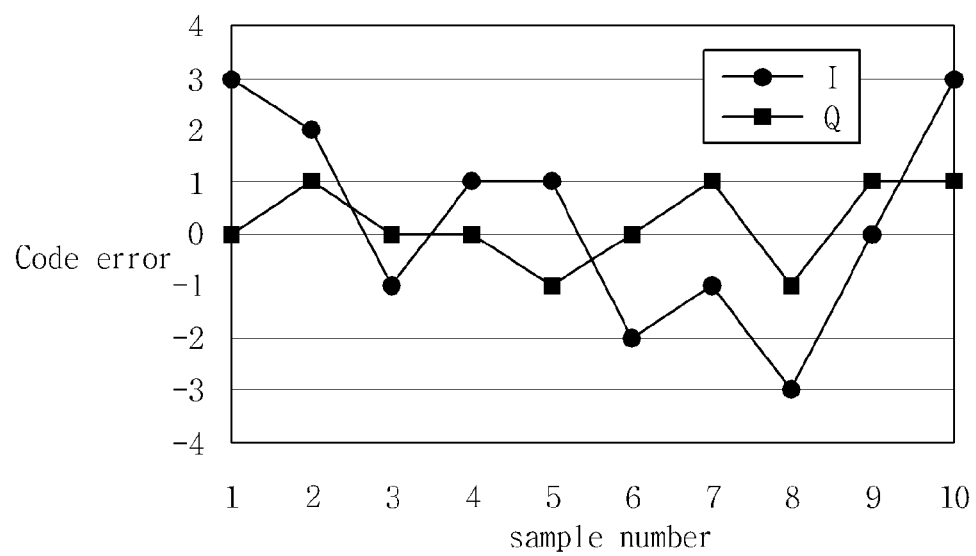

FIGS. 12A and 12B are graphs showing local oscillator leakage and code error when a carrier frequency is about 8.7 GHz.

Referring to FIG. 12A, it can be seen that when the carrier frequency is about 8.7 GHz, carrier leakage (e.g., local leakage) is reduced more than before a calibration operation according to example embodiments of inventive concepts is performed.

Referring to FIG. 12B, it can be seen that relatively few Q-code errors (e.g., one or two Q-code errors) and only relatively few I-code errors (e.g., two through four I-code errors) occur due to the calibration method according to example embodiments of inventive concepts.

Figure 13:
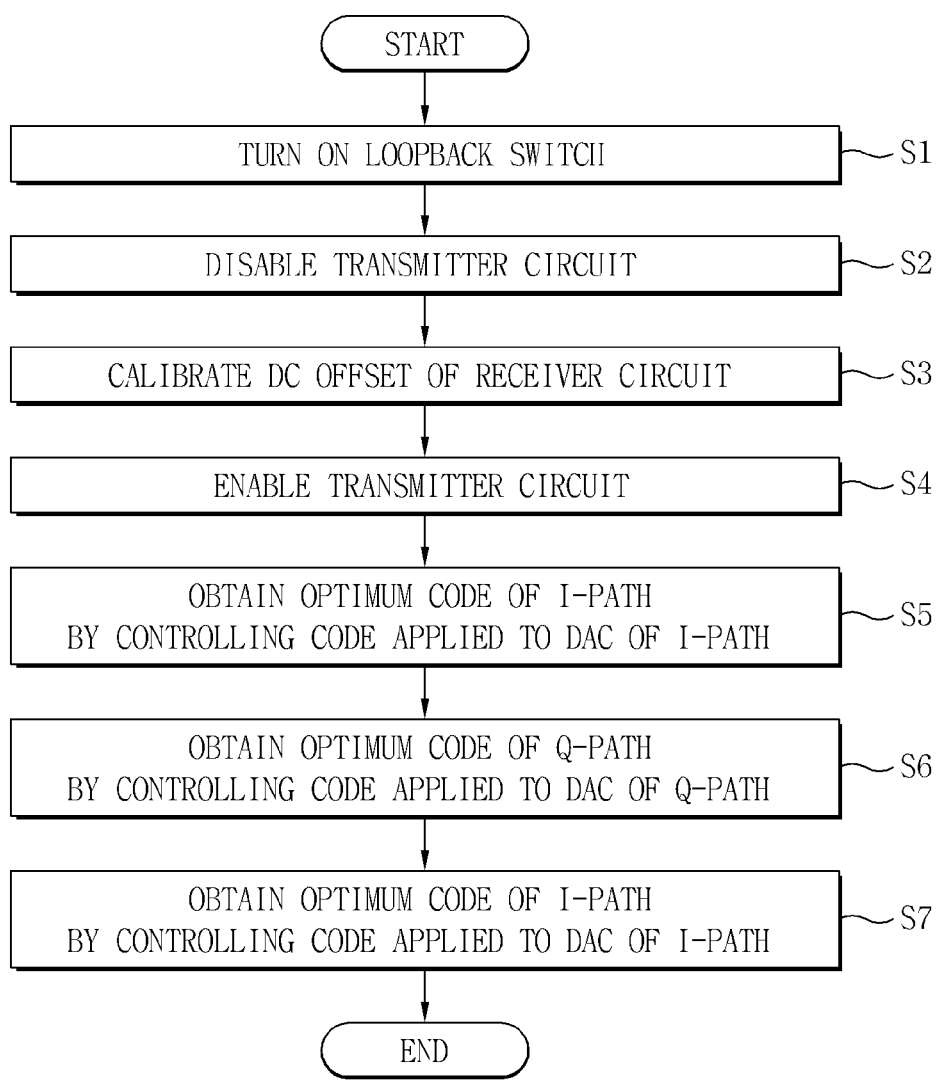
FIG. 13 is a flowchart illustrating a method of calibrating carrier leakage of a transceiver according to an example embodiment of inventive concepts.

FIG. 13 is a flowchart illustrating a method for calibrating carrier leakage of a transceiver according to example embodiments of inventive concepts. For example purposes, the method shown in FIG. 13 will be described with regard to the transceiver 100 shown in FIG. 1.

Referring to FIG. 13, at S1 the transceiver 100 turns on the loopback switch 182. At S2, the transceiver 100 disables the transmitter circuit 130. In this example, disabling the LPF 132 and LPF 137 at the transceiver circuit 130. At S3, the transceiver calibrates a DC offset of the receiver circuit 150. At S4, the transceiver 100 enables the transmitter circuit 130. In this example, enabling of the transceiver circuit 130 includes enabling the LPF 132 and the LPF 137. At S5, the transceiver 100 obtains an optimum code of an I-path by controlling a code applied to the DAC 134 of an I-path. At S6, the transceiver 100 obtains an optimum code of a Q-path by controlling a code applied to the DAC 139 of a Q-path. At S7, the transceiver 100 obtains the optimum code of the I-path by controlling the code applied to the DAC 134 of the I-path.

The method of calibrating the carrier leakage may further include detecting a DC offset of the I-path and a DC offset of the Q-path and performing a square-root-sum of the DC offset of the I-path and the DC offset of the Q-path.

Example embodiments of inventive concepts may be applied to a transceiver including both a transmitter circuit and a receiver circuit.

A transceiver according to at least some example embodiments of inventive concepts may perform a DAC operation on a calibration code without a transmission digital signal in a calibration mode to generate a calibration signal. The transceiver may change a bias of a mixer using the calibration signal to control leakage of a carrier signal generated by a local oscillator. The transceiver may output the carrier signal as a transmitter signal and transmit the transmitter signal through a loopback path to a receiver circuit. The receiver circuit may down-convert the transmitter signal, and generate a receiving digital signal.

Therefore, the transceiver may more stably reduce carrier leakage irrespective of processes, operation voltages, and/or operation temperatures.

The foregoing is illustrative of example embodiments and is not to be construed as limiting thereof. Although a few example embodiments have been described, those skilled in the art will readily appreciate that many modifications are possible in example embodiments without materially departing from the novel teachings. Accordingly, all such modifications are intended to be included within the scope of inventive concepts as defined in the claims. In the claims, means-plus-function clauses are intended to cover the structures described herein as performing the recited function, and not only structural equivalents but also equivalent structures.

What is claimed is:

1. A transceiver comprising:
a transmitter circuit configured to, in a normal mode, up-convert a transmission digital signal to generate a first transmission signal, the transmitter circuit being further configured to, in a calibration mode, perform a digital-to-analog conversion (DAC) operation on a calibration code without the transmission digital signal to generate a calibration signal, change a bias of a mixer in response to the calibration signal, and output a carrier signal of an oscillator as a second transmission signal;
a receiver circuit configured to, in a normal mode, down-convert a receiving signal received from an antenna to generate a first receiving digital signal, the receiver circuit being further configured to, in the calibration mode, down-convert the second transmission signal to generate a second receiving digital signal; and
a loopback switch configured to electrically connect an output terminal of the transmitter circuit with an input terminal of the receiver circuit in the calibration mode.

2. The transceiver of claim 1, further comprising:
a baseband processor configured to detect carrier leakage in response to the second receiving digital signal, the baseband processor being further configured to obtain the calibration code to suppress a direct-current (DC) offset of the transmitter circuit.

3. The transceiver of claim 1, wherein the transmitter circuit is configured to change the bias of the mixer to control leakage of the carrier signal.

4. The transceiver of claim 1, wherein the transmitter circuit comprises:
a first DAC configured to perform a DAC operation on an I-path transmission digital signal;
a first low-pass filter (LPF) configured to perform an LPF operation on an output signal from the first DAC to generate a first low-pass filtered transmission signal, the first LPF being configured to be disabled in response to a calibration mode signal;
a second DAC configured to perform a DAC operation on an I-path calibration code to generate an I-path calibration signal;
a first mixer configured to, in the normal mode, mix the first low-pass filtered transmission signal with an I-path transmission local oscillator signal to generate a first I-path transmission signal, the first mixer being further configured to, in the calibration mode, control leakage of the carrier signal in response to the I-path calibration signal, and output the carrier signal as a second I-path transmission signal;
a third DAC configured to perform a DAC operation on a Q-path transmission digital signal;
a second LPF configured to perform an LPF operation on an output signal of the third DAC to generate a second low-pass filtered transmission signal, the second LPF being further configured to be disabled in response to the calibration mode signal;
a fourth DAC configured to perform a DAC operation on a Q-path calibration code to generate a Q-path calibration signal; and
a second mixer configured to, in the normal mode, mix the second transmission signal with a Q-path transmission local oscillator signal to generate a first Q-path transmission signal, the second mixer being further configured to, in the calibration mode, control leakage of the carrier signal in response to the Q-path calibration signal, and output the carrier signal as a second Q-path transmission signal.

5. The transceiver of claim 1, wherein the receiver circuit comprises:
a first mixer configured to, in the normal mode, mix the receiving signal with an I-path receiving local oscillator signal to generate a first I-path receiving signal, the first mixer being further configured to, in the calibration mode, mix the second transmission signal with the I-path receiving local oscillator signal to generate a second I-path receiving signal;
a first LPF configured to perform an LPF operation on an output signal from the first mixer;
a first ADC configured to perform an ADC operation on an output signal from the first LPF to generate an I-path receiving digital signal;
a second mixer configured to, in the normal mode, mix the receiving signal with a Q-path receiving local oscillator signal to generate a first Q-path receiving signal, the second mixer being further configured to, in the calibration mode, mix the second transmission signal with the Q-path receiving local oscillator signal to generate a second Q-path receiving signal;
a second LPF configured to perform an LPF operation on an output signal from the second mixer; and
a second ADC configured to perform an ADC operation on an output signal from the second LPF to generate a Q-path receiving digital signal.

6. The transceiver of claim 1, further comprising:
a transceiving selection switch between an output terminal of the transmitter circuit and an input terminal of the receiver circuit, the transceiving selection switch being configured to selectively connect the antenna with one of the output terminal of the transmitter circuit and the input terminal of the receiver circuit.

7. The transceiver of claim 6, further comprising:
a transmission amplifier between the transmitter circuit and the transceiving selection switch, the transmission amplifier being configured to amplify the first transmission signal or the second transmission signal; and
a receiving amplifier between the transceiver selection switch and the input terminal of the receiver circuit.

8. The transceiver of claim 7, wherein the transmission amplifier is a power amplifier.

9. The transceiver of claim 7, wherein the receiving amplifier is a low-noise amplifier.

10. The transceiver of claim 7, wherein the loopback switch is between an output terminal of the transmission amplifier and an output terminal of the receiving amplifier.

11. The transceiver of claim 7, wherein the loopback switch is between an input terminal of the transmission amplifier and an output terminal of the receiving amplifier.

12. The transceiver of claim 1, further comprising:
a local oscillator configured to generate the carrier signal.

13. The transceiver of claim 1, wherein, in the calibration mode, the second receiving digital signal output from the receiver circuit is obtained by performing an ADC operation on a DC signal.

14. A transceiver comprising:
a transceiver circuit configured to output a carrier signal as a transmission signal, and to control leakage of a carrier signal based on a calibration signal, the calibration signal being generated based on based on a calibration code, the calibration code being indicative of a direct-current (DC) offset between paths of the transmission signal received at the transceiver circuit; wherein
the transceiver circuit includes a transmitter circuit configured to, in a calibration mode, perform a digital-to-analog conversion (DAC) operation on the calibration code without transmission digital signal to generate the calibration signal, change a bias of a mixer in response to the calibration signal, and output the carrier signal as the transmission signal.

15. The transceiver of claim 14, wherein the transmitter circuit is further configured to control the leakage of the carrier signal based on the calibration signal, and to generate the transmission signal based only on the carrier signal.

16. The transceiver of claim 15, wherein the transceiver circuit further comprises:
a receiver circuit configured to generate a received digital signal based on the transmission signal; and
a loopback switch configured to selectively connect an output terminal of the transmitter circuit with an input terminal of the receiver circuit, wherein
the calibration code is generated based on the received digital signal.

17. The transceiver of claim 14, further comprising:
a receiver circuit configured to generate a received digital signal based on the transmission signal, wherein
the calibration code is generated based on the received digital signal.

18. The transceiver of claim 14, further comprising:
a baseband processor configured to detect a DC offset between paths of the transmission signal, and to generate the calibration code based on the detected DC offset.

* * * * *